United States Patent
Schuling

(10) Patent No.: US 10,800,465 B2
(45) Date of Patent: Oct. 13, 2020

(54) ADAPTABLE TRUCK BED STORAGE SYSTEMS

(71) Applicant: Dee Zee, Inc., Des Moines, IA (US)

(72) Inventor: Eric Schuling, Bondurant, IA (US)

(73) Assignee: DEE ZEE, INC., Des Moines, IA (US)

( * ) Notice: Subject to any disclaimer, the term of this patent is extended or adjusted under 35 U.S.C. 154(b) by 0 days.

(21) Appl. No.: 16/280,523

(22) Filed: Feb. 20, 2019

(65) Prior Publication Data

US 2019/0256156 A1 Aug. 22, 2019

Related U.S. Application Data

(60) Provisional application No. 62/632,705, filed on Feb. 20, 2018.

(51) Int. Cl.
| | |
|---|---|
| *B62D 33/02* | (2006.01) |
| *B60R 9/06* | (2006.01) |
| *B60P 7/15* | (2006.01) |
| *B60P 7/08* | (2006.01) |
| *B62D 43/02* | (2006.01) |

(52) U.S. Cl.
CPC ........ *B62D 33/0207* (2013.01); *B60P 7/0815* (2013.01); *B60P 7/15* (2013.01); *B60R 9/06* (2013.01); *B62D 43/02* (2013.01)

(58) Field of Classification Search
CPC .............................. B60P 7/15; B62D 33/0207
USPC ......................................... 224/403, 282, 310
See application file for complete search history.

(56) References Cited

U.S. PATENT DOCUMENTS

| | | | | |
|---|---|---|---|---|
| 4,824,302 A | * | 4/1989 | Schultheis | B60P 7/15 211/105.3 |
| 5,215,288 A | | 6/1993 | Lyon | |
| 5,305,936 A | * | 4/1994 | Nusbaum | B60R 9/06 211/17 |
| 5,329,858 A | * | 7/1994 | Morris | B60P 7/15 105/178 |
| 6,347,731 B1 | * | 2/2002 | Burger | B60R 9/00 224/402 |
| 6,607,338 B2 | * | 8/2003 | Lemke | B60P 7/15 410/143 |

(Continued)

OTHER PUBLICATIONS

International Search Report & Written Opinion pertaining to Application No. PCT/US2019/018562 filed Feb. 19, 2019.

*Primary Examiner* — Adam J Waggenspack
(74) *Attorney, Agent, or Firm* — Dinsmore & Shohl LLP

(57) ABSTRACT

A vehicle that includes an adaptable truck bed storage system includes a truck bed with a first sidewall and a second sidewall. The adaptable truck bed storage system is configured to receive accessories and includes an anchoring assembly that includes a first fixed end coupled to the first sidewall and a second fixed end coupled to the second sidewall. The anchoring assembly includes at least one pin. The adaptable truck bed storage system further includes an indexable center bar that extends between the first fixed end and the second fixed end. The indexable center bar includes a plurality of accessory channels on a plurality of sides of the indexable center bar. The accessory channels extend at least a portion of a length of the indexable center bar. The indexable center bar is indexable between a plurality of discrete positions and the pin locks the indexable center bar in one of the discrete positions to adapt the adaptable truck bed storage system.

20 Claims, 14 Drawing Sheets

(56) References Cited

U.S. PATENT DOCUMENTS

| | | | | |
|---|---|---|---|---|
| 2004/0134953 A1* | 7/2004 | Perez | ........................ | B60P 3/40 |
| | | | | 224/403 |
| 2006/0222471 A1 | 10/2006 | Lussier | | |
| 2007/0048104 A1* | 3/2007 | Scott | ........................ | B60P 7/15 |
| | | | | 410/151 |
| 2007/0110539 A1* | 5/2007 | Klinkman | ................. | B60P 7/15 |
| | | | | 410/150 |
| 2007/0286697 A1* | 12/2007 | Kmita | ....................... | B60P 7/15 |
| | | | | 410/150 |
| 2008/0101883 A1* | 5/2008 | Derecktor | ............. | B60P 7/0815 |
| | | | | 410/104 |

* cited by examiner

ADAPTABLE TRUCK BED STORAGE SYSTEMS

CROSS-REFERENCE TO RELATED APPLICATION

This application claims the benefit of U.S. Provisional Patent Application No. 62/632,705, filed Feb. 20, 2018, hereby incorporated by reference in its entirety.

TECHNICAL FIELD

The present specification generally relates to an adaptable truck bed storage system for storing cargo in a truck bed and, more specifically, an adaptable truck bed storage system including an adaptable cargo bar for storing cargo in a truck bed.

BACKGROUND

Vehicles, such as trucks and SUVs for example, may include a truck bed (hereinafter referred to as "truck bed" or simply "bed"). Truck beds may be used to store and transport items with and within the vehicle. Truck beds generally include an open space surrounded by one or more walls, for example a truck bed may be surrounded by a pair of sidewalls, a front wall, and a tailgate. The truck bed may be a convenient area for storing items, but may lack mechanisms for organizing the items within the bed or for fastening and securing the items as the vehicle moves. Moreover, it may be difficult to adapt the space above a top end of the walls of the bed without some sort of adaptable truck bed storage system.

Accordingly, a need exists for an adaptable truck bed storage system including an adaptable cargo bar for storing cargo in and above a truck bed.

SUMMARY

In one embodiment, a vehicle includes an adaptable truck bed storage system including a first sidewall and a second sidewall, and an adaptable truck bed storage system configured to receive accessories that includes an anchoring assembly including a first fixed end coupled to the first sidewall and a second fixed end coupled to the second sidewall, the anchoring assembly including at least one pin, and an indexable center bar that extends between the first fixed end and the second fixed end, the indexable center bar including a plurality of accessory channels on a plurality of sides of the indexable center bar, the accessory channels extending at least a portion of a length of the indexable center bar. The indexable center bar is indexable between a plurality of discrete positions and the pin locks the indexable center bar in one of the discrete positions to adapt the adaptable truck bed storage system.

In another embodiment, an adaptable truck bed storage system configured to receive accessories includes an anchoring assembly comprising a first fixed end coupled to the first sidewall and a second fixed end coupled to the second sidewall, the anchoring assembly including at least one pin, an indexable center bar that extends between the first fixed end and the second fixed end, the indexable center bar comprising a plurality of accessory channels on a plurality of sides of the indexable center bar, the accessory channels extending at least a portion of a length of the indexable center bar. The indexable center bar is indexable between a plurality of discrete positions and the pin locks the indexable center bar in one of the discrete positions to adapt the adaptable truck bed storage system.

In yet another embodiment, a method of adapting a truck bed that includes a first sidewall and a second sidewall to store accessories includes installing an adaptable truck bed storage system configured to receive accessories, the adaptable truck bed storage system including an anchoring assembly including a first fixed end and a second fixed end, the first fixed end and the second fixed end each including a fixed end peg that extends inward from the first fixed end and the second fixed end, inserting the fixed end pegs through a support hole of an indexable center bar of the adaptable truck bed storage system to hold the indexable center bar in the vehicle vertical direction, and installing an accessory in an accessory channel of the indexable center bar.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Truck beds in trucks and other sport utility vehicles (SUVs) may be used to store various items of cargo (e.g., shipping boxes, sporting equipment, spare tires, etc.). In some instances, it may be useful for this cargo to be stored in a particular orientation or held or arranged in a particular location within the truck bed. For example, a spare tire may be stored on its side (i.e., such that the tread is in contact with the truck bed floor) to save room for other cargo within the truck bed. Additionally, cargo may experience acceleration as the vehicle moves from place to place. This acceleration may tend to move any cargo that is not held in place in the truck bed. Further, some cargo may have physical characteristics that require a particular adaptation to secure the cargo within a truck bed without negatively affecting the cargo. Accordingly, adaptable truck bed storage systems that may include an adaptable cargo bar for storing cargo in and above a truck bed may be required.

Figure 1:
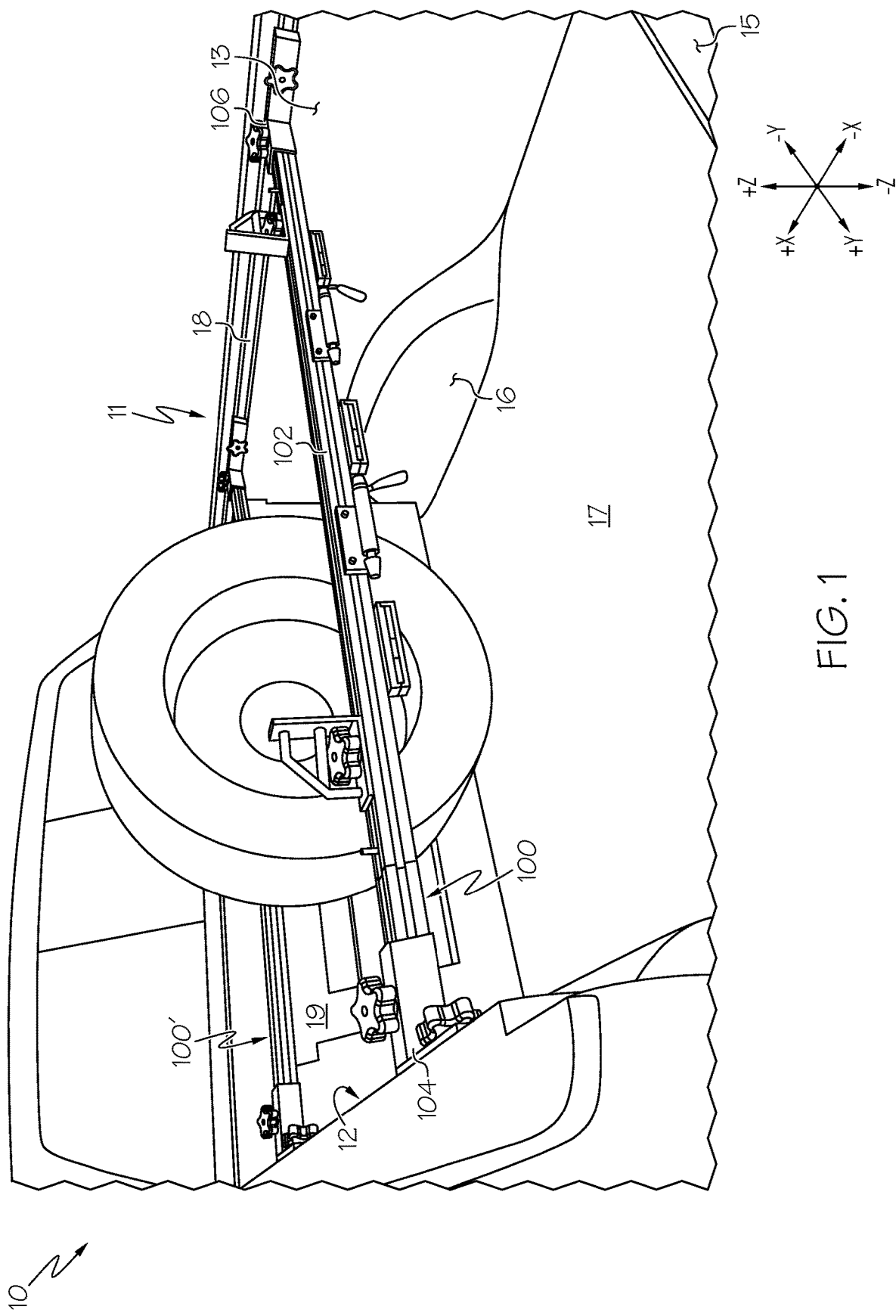
FIG. 1 depicts a truck with a truck bed including an adaptable truck bed storage system with a cargo bar that spans across a width of the truck bed, according to one or more embodiments shown and described herein.

FIG. 1 generally depicts a truck with a truck bed including a truck bed storage system with a cargo bar that spans across a width of the truck bed. The truck bed storage system includes an indexable center bar that has multiple sides and spans between a first fixed end and a second fixed end of an anchoring assembly that are each fixed to the walls of the truck bed. One or more accessories are configured to be removably installed at one or more of the sides of the indexable center bar and the indexable center bar is indexable around an axis that spans between the first fixed end and the second fixed. The indexable center bar is indexable to configure the indexable center bar for interaction with various types of cargo within the truck bed.

As used herein, the term "vehicle longitudinal direction" or "longitudinal direction" is used to refer to the forward and rearward direction of a vehicle. The term "vehicle lateral direction" or "lateral direction" is used to refer to the left and right direction of a vehicle. The term "inward" or "outward" is used to refer to a direction that is toward a vehicle centerline with respect to a position that is further from the vehicle centerline or away from a vehicle centerline with respect to a position that is nearer the vehicle centerline, respectively. As used herein, the term "vehicle vertical direction" or "vertical direction" refers to the upward and downward direction of a vehicle with respect to the ground.

Referring now to FIG. 1, a vehicle 10 including a truck bed 11 is shown. The truck bed 11 is generally a void that is surrounded by a first sidewall 12 (shown on the left of the vehicle 10), a second sidewall 13 (shown on the right of the vehicle 10), a front wall 14, and a rear wall 15. The rear wall 15 shown in FIG. 1 is an adjustable rear wall 15, commonly referred to as a "tailgate," that is shown pivoted around a connection with the vehicle 10 at a bottom portion of the rear wall 15, but embodiments are not limited to this arrangement. It is contemplated that embodiments of the vehicle 10 may include a rear wall 15 that is fixed in the upright position. The first sidewall 12 and the second sidewall 13 may each include a fender well 16. The truck bed 11 may include a lining 17 that may line one or more of the floor and the walls of the truck bed 11. Additionally, it is to be understood that, while embodiments of the adaptable cargo assembly 100 described herein are described as functioning within the truck bed 11 of the vehicle 10, the adaptable cargo assembly 100 could be adapted to fit within walls of any vehicle regardless of class, size, make, model, etc., and that embodiments are not limited to application within a truck bed.

The first sidewall 12 and the second sidewall 13 may each include sidewall accessory tracks 18. The sidewall accessory tracks 18 may be tracks or grooves installed in or otherwise coupled to the sidewall. The sidewall accessory tracks 18 may extend generally in the vehicle longitudinal direction. The sidewall accessory tracks 18 may include a lip or other means for attaching one or more sidewall accessories or other types of implementations to the first sidewall 12 and the second sidewall 13 of the vehicle 10 using an attachment means such as a threaded fastener.

An adaptable cargo bar assembly 100 may extend between the sidewall accessory tracks 18. In some embodiments, multiple cargo bar assemblies (e.g., a second adaptable cargo bar assembly 100') may extend between the sidewall accessory tracks. The adaptable cargo bar assembly 100 may include an indexable center bar 102 that extends between a first fixed end 104 and a second fixed end 106. The first fixed end 104 and the second fixed end 106 may be coupled to the vehicle 10 at the sidewall accessory tracks 18 as will be described in greater detail. The adaptable cargo bar assembly 100 may be configured to include one or more accessories and to index through the accessories to configure the vehicle 10 to hold one or more items in the truck bed 11 with the adaptable cargo bar assembly 100 as will be described in greater detail herein.

In the particular exemplary embodiment depicted in FIG. 1, the adaptable cargo bar assembly 100 and the second adaptable cargo bar assembly 100' are used to hold up a tire 20. The tire 20 rests against the second adaptable cargo bar assembly 100' such that it occupies a reduced footprint within the bed of the vehicle 10 such that other items (e.g., cargo) can be stored within the truck bed 11. It is to be understood that this is merely an exemplary use of the assembly and that other uses are contemplated in accordance with the description herein.

Figure 2:
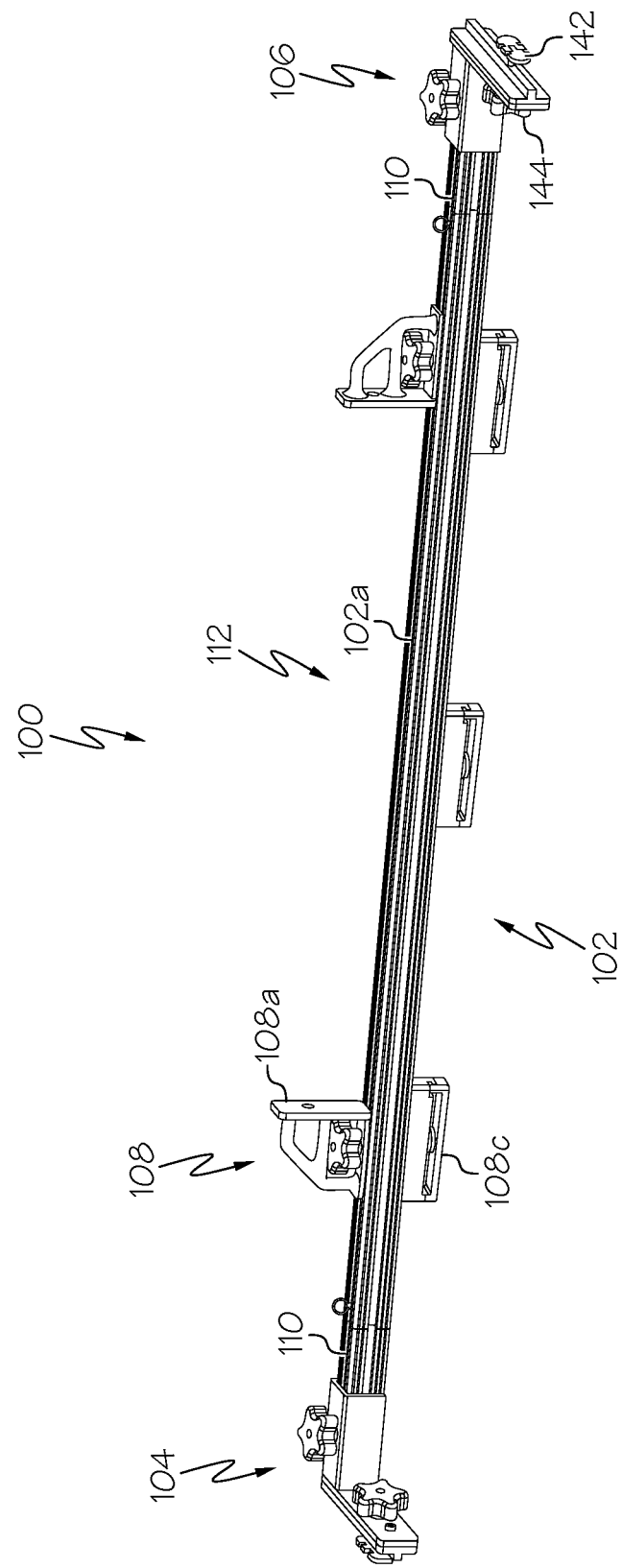
FIG. 2 depicts the truck bed storage system of FIG. 1 in isolation with the cargo bar shown including multiple types of cargo bar accessories and spanning between two fixed ends, according to one or more embodiments shown and described herein.
Figure 14:
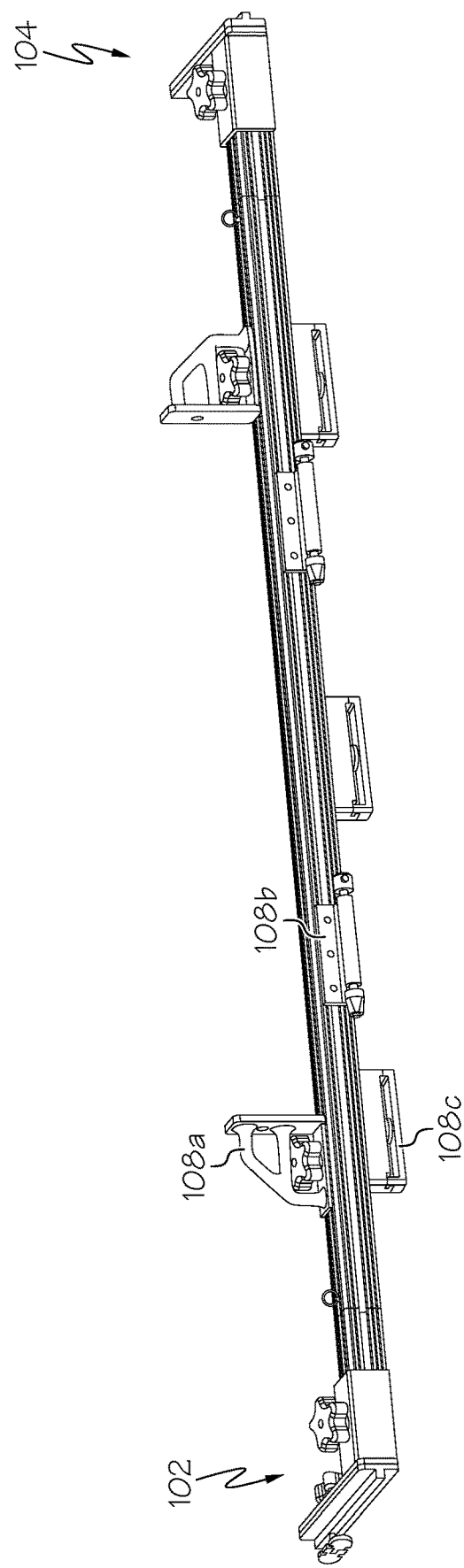
FIG. 14 depicts a rear view of the truck bed storage system of FIG. 1 with an indexable center bar installed between a first side fixed end and a second side fixed end of the adaptable cargo storage system, according to one or more embodiments shown and described herein.

Referring now to FIG. 2, the adaptable cargo bar assembly 100 of FIG. 1 is schematically depicted in isolation. The adaptable cargo bar assembly 100 includes the first fixed end 104, the second fixed end 106, and the indexable center bar 102. The indexable center bar 102 may index through two or more discrete positions to reposition one or more accessories that may be removably attached to the indexable center bar 102. Briefly referring to FIG. 14, the indexable center bar 102 may be configured to removably attach to one or more clamps 108a, anchors 108b, platforms 108c, and/or other accessories. Referring again to FIG. 2, the clamps 108a and platforms 108c, and other accessories (e.g., the anchors 108b shown in FIG. 14, etc.) may removably couple to the indexable center bar 102 at one or more sides of the indexable center bar 102, e.g., a first side 102a. The particular example embodiment in FIG. 2 shows an indexable center bar 102 with four sides, but embodiments are not so limited.

Figure 4:
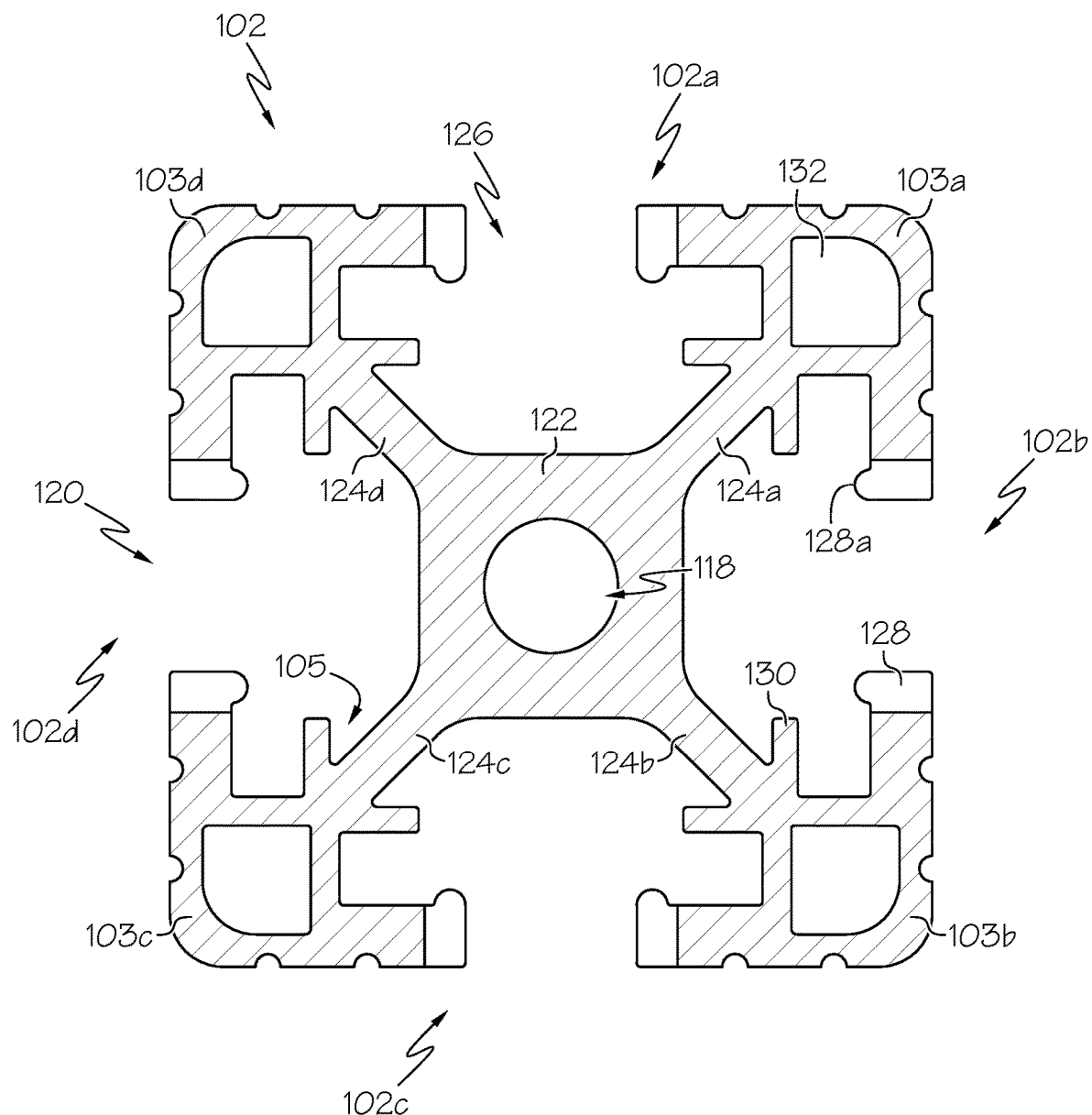
FIG. 4 depicts a zoomed-in cross sectional view of the indexable center bar that spans across the width of the truck bed of FIG. 1, according to one or more embodiments shown and described herein.

Still referring to FIG. 2, the first fixed end 104 and the second fixed end 106 each include a biased pin 110 that is used to hold the indexable center bar 102 in one of the two or more discrete positions. As depicted in FIG. 2, the indexable center bar 102 is in a first position with the first side 102a at the top of the indexable center bar 102, but the indexable center bar 102 can rotate through several positions by pulling the biased pin 110 and unlocking the indexable center bar 102 as described in greater detail herein. Additionally, while the particular example embodiment of the indexable center bar 102 depicted in FIG. 2 has four sides (i.e., the side profile the indexable center bar 102 makes a quadrangle as shown in FIG. 4), it is contemplated that embodiments might include any number of sides, including, but not limited to, two, three, five, six, seven, or eight sides.

Figure 3:
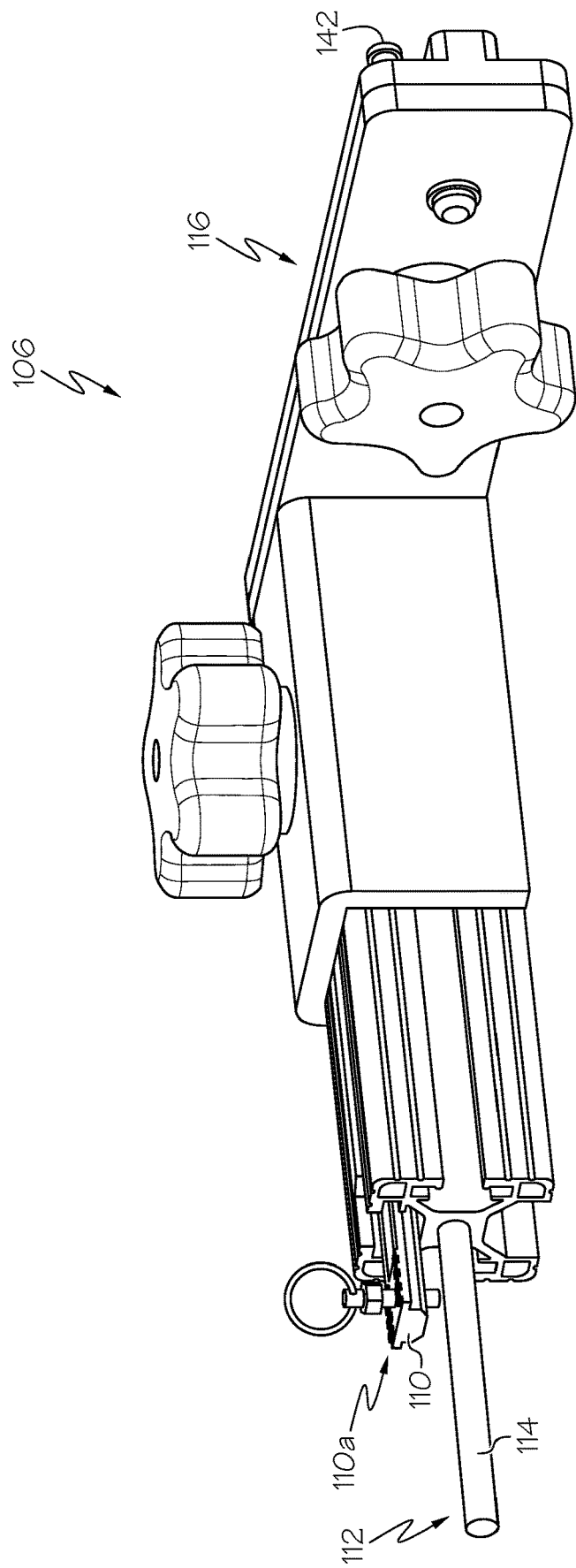
FIG. 3 depicts a first side fixed end of the truck bed storage system of FIG. 1, according to one or more embodiments shown and described herein.

Referring to both FIGS. 2 and 3, the biased pins 110 may be selectively actuated to allow or prevent the indexable center bar 102 to rotate about an indexing axis 112 that extends between the first fixed end 104 and the second fixed end 106. While the particular embodiment shown in FIG. 2 has biased pins 110 in the top of the first fixed end 104 and the second fixed end 106, it is to be understood that the biased pins 110 could be configured in any one of the sides of the first fixed end 104 and the second fixed end 106. In some embodiments, the biased pins 110 may be located on the indexable center bar 102 and extend therefrom, into the first fixed end 104 and the second fixed end 106 to lock the indexable center bar 102 in place.

The indexable center bar 102 may be formed of a metal such as, for example, aluminum, copper, nickel, steel, titanium, or steel and may be fabricated using an extrusion process, but embodiments are not so limited. It is contemplated that the indexable center bar 102 and other components of the adaptable cargo bar assembly 100 may be formed from a plastic material, such as a high density plastic like polyethylene ("PE"), polypropylene, polyvinyl chloride ("PVC"), and the like, and may be fabricated using a process such as, for example, plastic extrusion, or may be fabricated from a carbon-based material, such as carbon fiber.

Briefly referring to FIGS. 1, 2, and 3, the first fixed end 104 and the second fixed end 106 fix to the first sidewall 12 and the second sidewall 13, respectively, in the sidewall accessory tracks 18 such that they maintain a constant vertical orientation in the vehicle vertical direction with respect to the vehicle 10. The first fixed end 104 and the second fixed end 106 can be moved along the sidewall accessory tracks 18 in the vehicle longitudinal direction by adjusting a clamping pressure of one or more sidewall clamps 116. The sidewall clamps 116 may include fixed end attachment mechanisms 142 that slide into the sidewall accessory tracks 18 of the sidewalls of the truck bed 11. The first fixed end 104 and the second fixed end 106 may be fixed in one position along the longitudinal length of the truck bed 11 by adjusting the clamping pressure between the sidewall accessory tracks 18 and the fixed end attachment mechanisms 142 by adjusting a fixed end knob 144.

By adjusting the relative longitudinal position of the first fixed end 104 and the second fixed end 106 along the sidewall accessory tracks 18, the relative longitudinal position of the indexing axis 112 can be moved in the vehicle longitudinal direction because the first fixed end 104 and the second fixed end 106 each include a fixed end peg 114 that extends inward from the first fixed end 104 and the second fixed end 106 along the indexing axis 112. Briefly referring to FIGS. 3 and 4, the fixed end pegs 114 hold the indexable center bar 102 vertically by extending into a support hole 118 of the indexable center bar 102. The longitudinal position of the indexable center bar 102 can be adjusted by moving the first fixed end 104 and the second fixed end 106 forward and rearward along the sidewall accessory tracks 18 with the indexable center bar 102 in position along the indexing axis 112.

Figure 10:
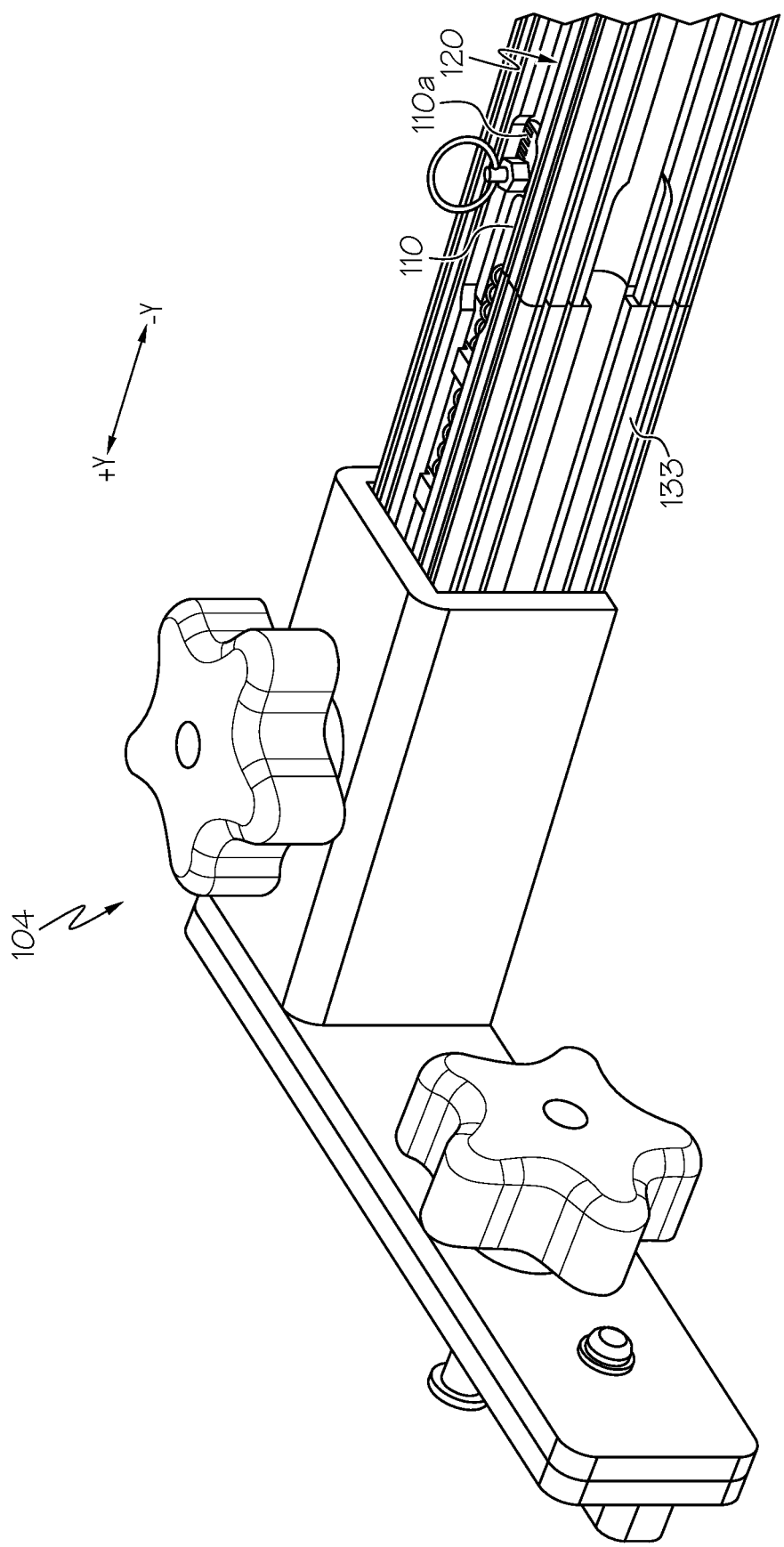
FIG. 10 depicts a zoomed-in view of a first fixed end of the truck bed storage system of FIG. 1 with a pull pin in a locked position, according to one or more embodiments shown and described herein.

Referring to FIGS. 3 and 10, the biased pin 110 is depicted in detail. The biased pin 110 may be a pin that selectively extends from an inward end of each of the first fixed end 104 and the second fixed end 106 and is biased by a biasing mechanism, such as a spring, in the vehicle inward direction. The biased pin 110 may include notches 110a that interact with a bump 128a (FIG. 4) in an outer lip 128 of the indexable center bar 102 to increase the resistance to removal of the biased pin 110 from an accessory channel 120 of the indexable center bar 102. Additionally, the biased pin 110 may be contoured to fit within the accessory channel 120 to further prevent rotation of the indexable center bar 102 while the biased pin 110 is in the accessory channel 120. That is, in embodiments the biased pin 110 may selectively extend into the accessory channel 120 of the indexable center bar 102 to selectively enable indexing of the indexable center bar 102 about the indexing axis 112. In the particular embodiment shown in FIG. 3, the biased pin 110 is in a locking position that locks the indexable center bar 102 and prevents it from rotating by interfering with the rotational motion of the indexable center bar 102.

FIG. 4 shows a cross-sectional view of the indexable center bar 102. In some embodiments, the indexable center bar 102 may have a constant cross sectional profile along the length of the indexable center bar 102, but embodiments are not limited to such a configuration. It is contemplated that a cross sectional profile of the indexable center bar 102 may change along a length of the indexable center bar 102. For example, the cross sectional profile of the indexable center bar 102 may increase or decrease in size along a length of the indexable center bar 102. The length dimension of the indexable center bar 102 is the dimension that may span the width of the truck bed when the indexable center bar 102 is installed.

The particular exemplary embodiment of the indexable center bar 102 depicted in FIG. 4 includes the first side 102a, the second side 102b, the third side 102c, and a fourth side 102d, but embodiments may have more or less than four sides, such as six sides (hexagonal) or more. The sides 102a, 102b, 102c, 102d may be formed by four flanges 103a, 103b, 103c, 103d that are integrally formed with and extend outwardly from a base 122 at four radial walls 124a, 124b, 124c, 124d. At their outermost portion, the flanges 103a, 103b, 103, 103d may include outwardly facing walls that may meet at a right angle to form the sides 102a, 102b, 102c, 102d of the indexable center bar 102. Each side 102a, 102b, 102c, 102d may include a T-bar slot 126. The T-bar slot 126 may be used to connect the one or more accessories to the indexable center bar 102.

The T-bar slot 126 forms an opening for the accessory channel 120. An outer lip 128 and an inner lip 130 may extend into the accessory channel 120. The outer lip 128 may include bumps 128a that extend inward toward the base 122 from opposite ends of the flanges 103. The one or more accessories attached to the indexable center bar 102 may attach to one or more of the outer lip 128 and the inner lip 130. The indexable center bar 102 may include one or more cavities 132 to reduce the weight of the indexable center bar 102. Additionally, the indexable center bar 102 may include one or more notches 105. The notches 105 may guide accessories along a length of the indexable center bar 102 as the accessories are slid into place and the notches 105 generally increase the surface area to increase the friction between installed accessories and the indexable center bar 102.

Figure 5:
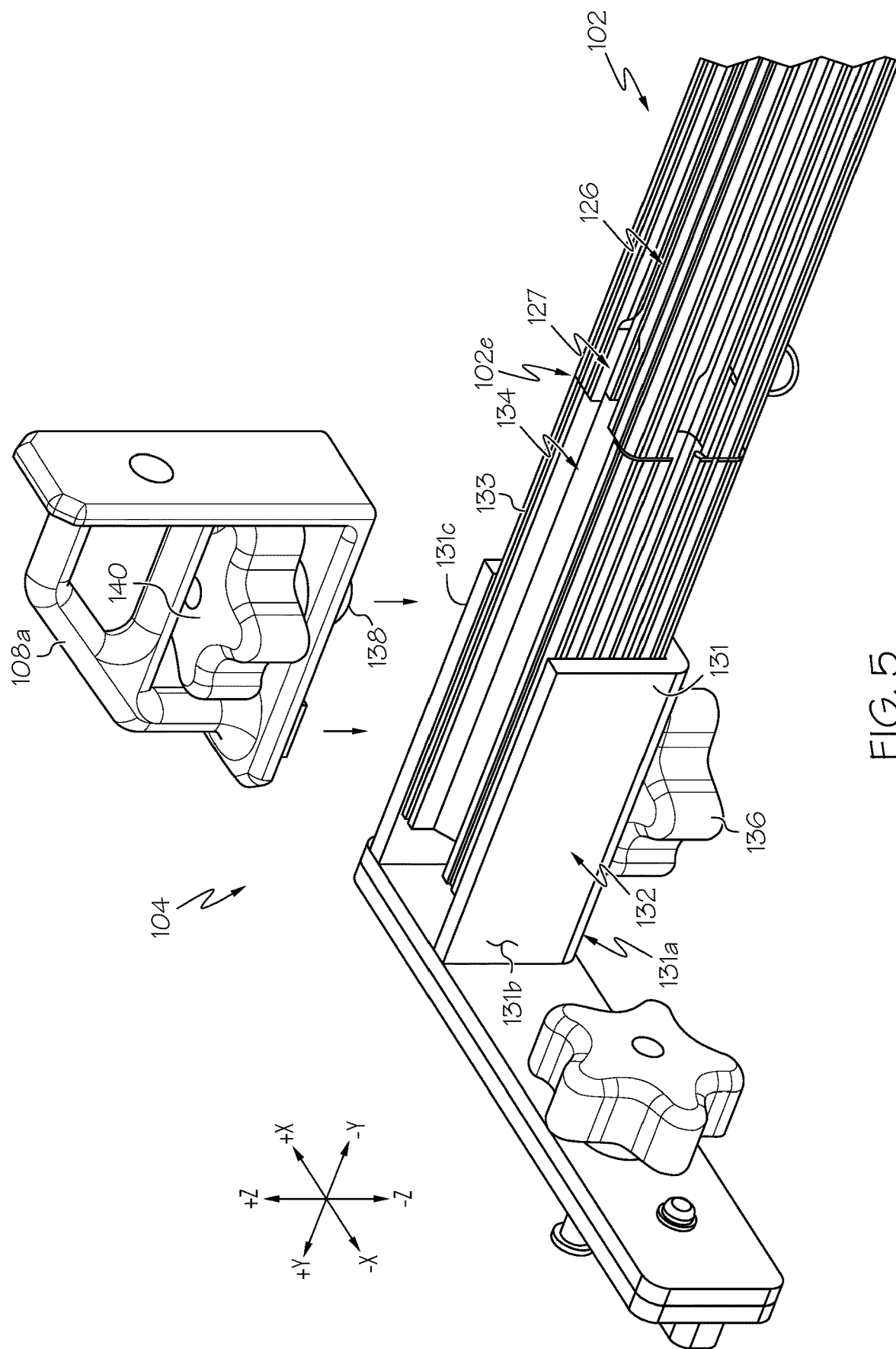
FIG. 5 depicts a bottom view of a first side end of the truck bed storage system of FIG. 1 with an accessory in an uninstalled position, according to one or more embodiments shown and described herein.

FIG. 5 shows a bottom view of the first fixed end 104 coupled to a first end 102e of the indexable center bar 102. The first fixed end 104 may include a first anchor 131. A first fixed bar 133 with a wide slot 134 may fit within the first anchor 131. The first anchor 131 holds the first fixed bar 133 up in the vertical direction. The first fixed bar 133 is selectively attached to the first anchor 131 and the connection may be adjusted with the knob 136. The first fixed bar 133 includes the wide slot 134 for receiving one or more accessories. Although not depicted, it should be understood that in some embodiments, a configuration of the second fixed end 106 is substantially similar, although mirrored, on the opposite side of the truck bed.

As depicted in FIG. 5, the T-bar slot 126 of the indexable center bar 102 may include a compatibility slot 127 that extends along a longitudinal length of the indexable center bar 102 between the first end 102e of the indexable center bar 102 and the T-bar slot 126. The compatibility slot 127 is wider than the T-bar slot 126 and may act as a guide for accessories that are inserted into the T-bar slot 126.

The first anchor 131 includes a top wall 131a and two sidewalls 131b, 131c. A bottom of the first anchor 131 may be open to allow insertion of the first fixed bar 133. The first fixed bar 133 may be held in the first anchor 131 by a fastening mechanism that can be tightened using the knob 136. The first fixed bar 133 is similar to the indexable center bar 102, but the first fixed bar 133 includes at least one wide slot 134 that faces downward. The wide slot 134 may be wider than the attachment mechanisms of the accessories that may be installed in the T-bar slot 126 of the sides 102a-102d of the indexable center bar 102 and the wide slot 134 may be configured such that it can be substantially aligned with the compatibility slot 127 in each side of the sides 102a, 102b, 102c, 102d of the indexable center bar 102.

Figure 6:
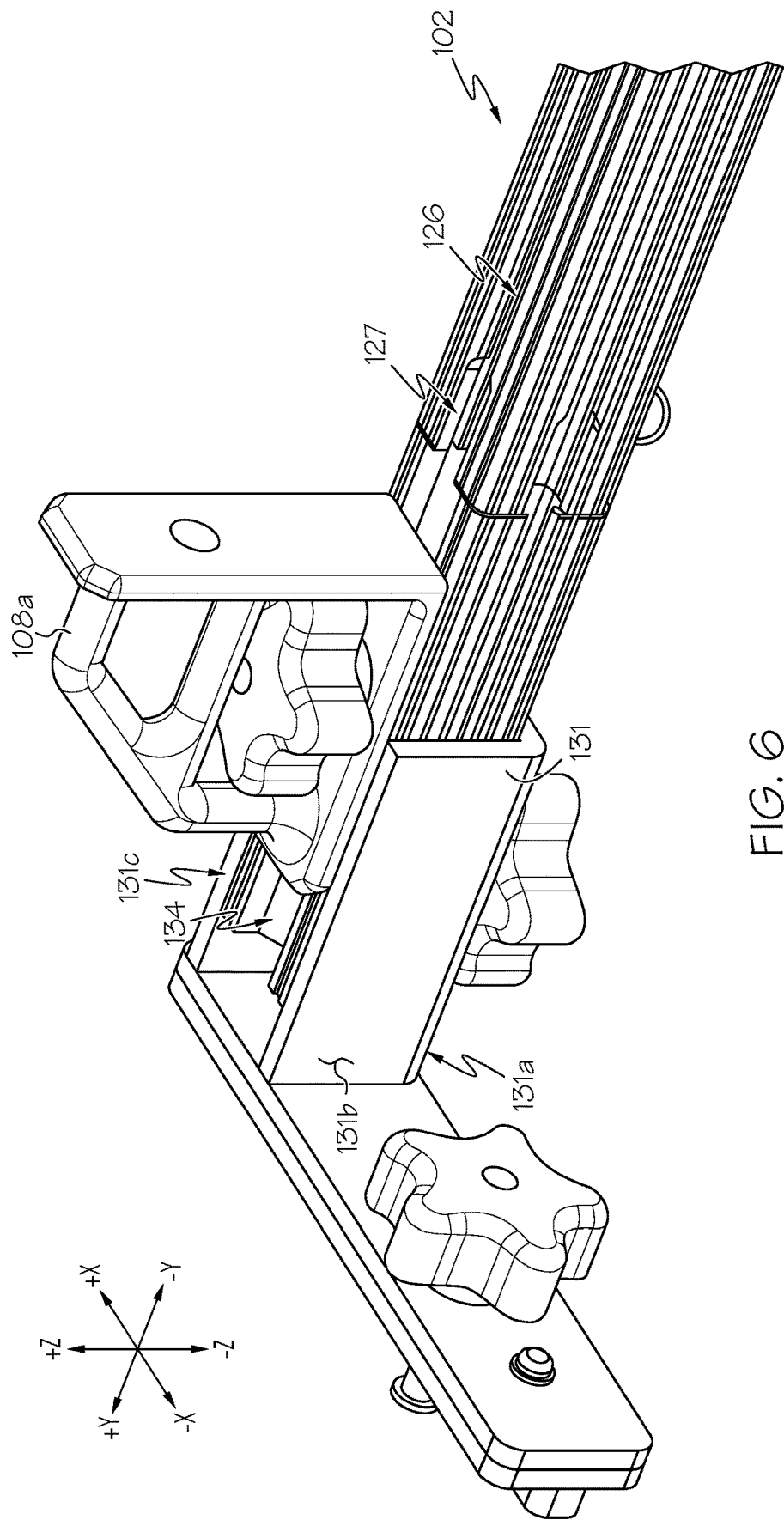
FIG. 6 depicts the first side end of the truck bed storage system of FIG. 5 with an accessory in an intermediate position, according to one or more embodiments shown and described herein.
Figure 7:
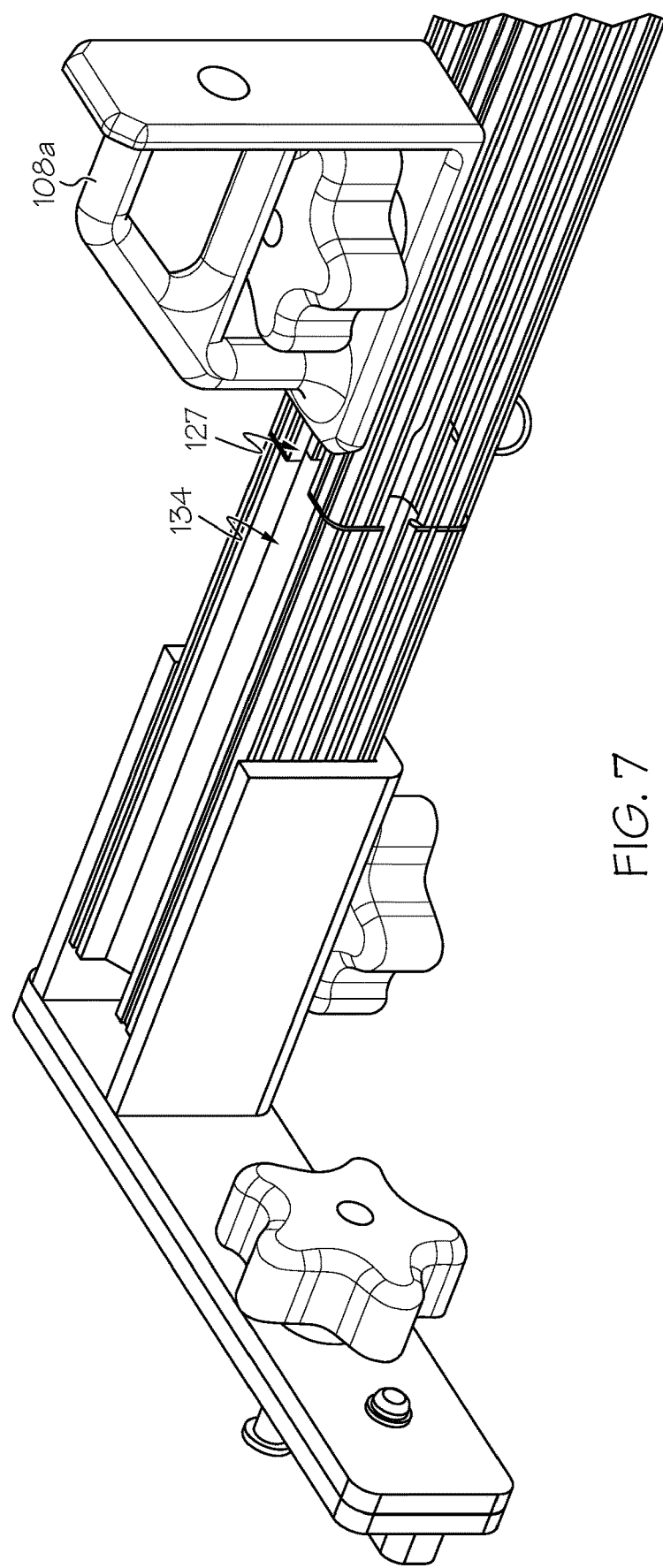
FIG. 7 depicts the first side end of the truck bed storage system of FIG. 6 with an accessory in an installed position, according to one or more embodiments shown and described herein.

Referring now to FIGS. 5-7, installation of one or more accessories will be described with reference to the FIGS. FIG. 5 shows the first fixed end 104 holding the first fixed bar 133 at the first anchor 131. A bottom view including the first fixed end 104 and the wide slot 134 in the first fixed bar 133 facing downward is depicted. Clamps 108a are shown as a first accessory with an accessory attachment mechanism 138 [need to add to FIG. 5] facing the wide slot 134. The accessory attachment mechanism 138 may be configured to apply an adjustable pressure to the T-bar slot 126 of the indexable center bar 102, for example, by adjusting an accessory knob 140 once the accessory is in the T-bar slot 126.

The accessory attachment mechanisms 138 may be inserted in the wide slot 134 as depicted by the double arrows in FIG. 5. Once the accessory has been inserted in the wide slot 134, it may be moved in the vehicle inward direction (−y as depicted in FIG. 5) through the compatibility slot 127 and into the T-bar slot 126 as indicated by the double arrows in FIG. 6. The accessory may be selectively located to any position along the length of the indexable center bar 102.

Once the accessory is in the correct position along the length of the indexable center bar 102 the accessory knob 140 may be adjusted to tighten the connection between the accessory attachment mechanism 138 and the T-bar slot 126 to hold the accessory in place in the correct position along the length of the indexable center bar 102. Additional accessories may then be installed on the indexable center bar 102. For example, one or more additional accessories may be installed on the indexable center bar 102 at the first fixed bar 133 or the second fixed bar (not shown) by sliding the accessories as described and actuating the respective attachment mechanisms of the additional accessories into the T-bar slot 126. Additionally, the indexable center bar 102 may be indexed to any one of the other three positions and additional accessories may be installed in the other T-bar slots of the indexable center bar 102.

Figure 8:
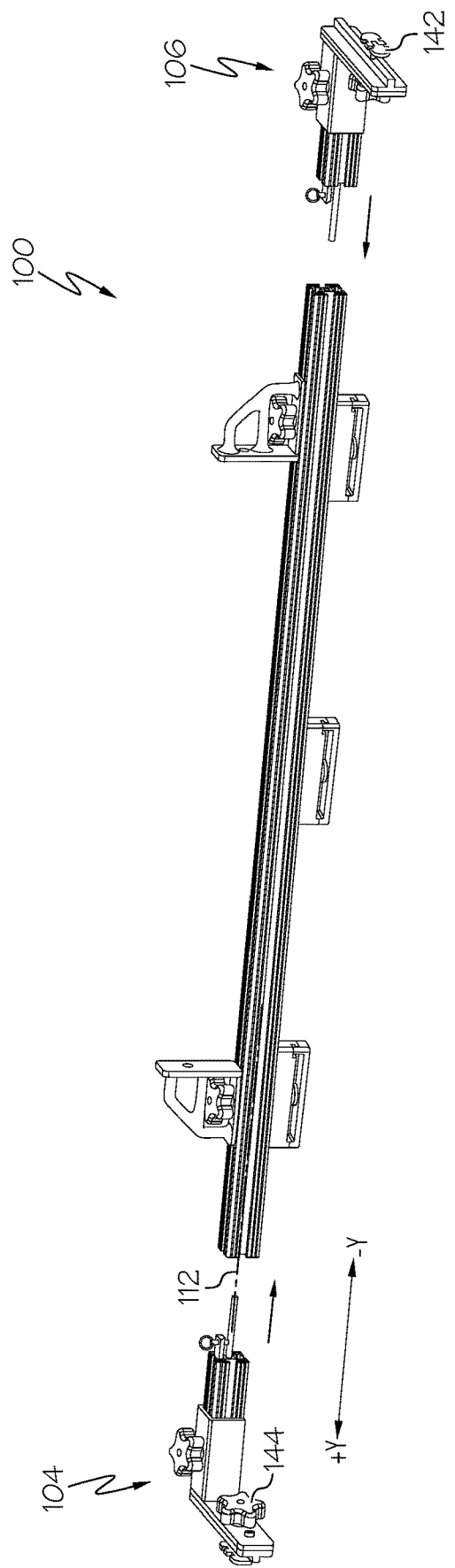
FIG. 8 depicts an exploded view of the truck bed storage system of FIG. 1 with an indexable center bar separated from a first side fixed end and a second side fixed end of the adaptable cargo storage system of FIG. 1, according to one or more embodiments shown and described herein.
Figure 9:
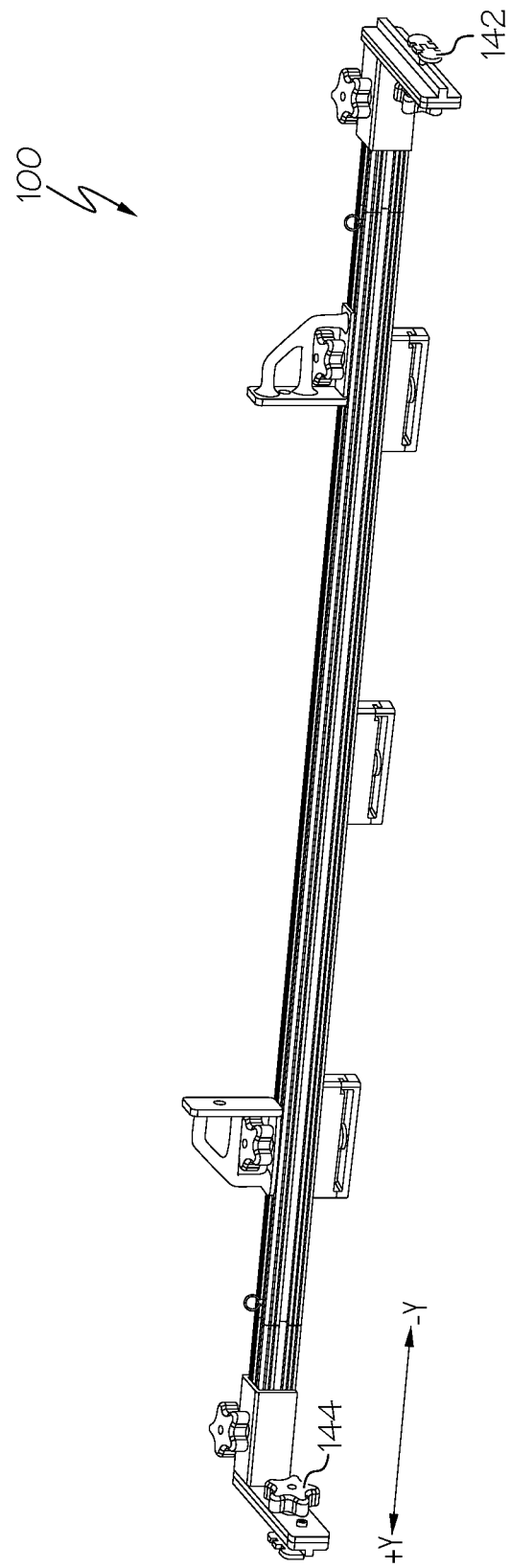
FIG. 9 depicts the truck bed storage system of FIG. 1 with an indexable center bar installed between a first side fixed end and a second side fixed end of the adaptable cargo storage system of FIG. 1, according to one or more embodiments shown and described herein.

FIGS. 8 and 9 depict the indexable adaptable cargo assembly 100 in an exploded view and a connected view, respectively, to depict installation of the indexable center bar 102. As shown in FIG. 8, the indexable center bar 102 may be installed between the first fixed end 104 and the second fixed end 106. As described herein, the first fixed end 104 and the second fixed end 106 may be attached to the first sidewall 12 and second sidewall 13 of the truck bed and configured to slide along the sidewalls in the vehicle longitudinal direction. The indexable center bar 102 may be positioned between the first fixed end 104 and the second fixed end 106 before the fixed end attachment mechanisms 142 are placed inside the sidewall accessory tracks 18. The indexable center bar 102 may be supported in the vehicle vertical direction between the first fixed end 104 and the second fixed end 106 by the fixed end pegs 114. The fixed end pegs 114 may be inserted into the support hole 118 (best shown in FIG. 4) of the indexable center bar 102 as indicated by the double arrows of FIG. 9. The indexable center bar 102 can rotate about the fixed end pegs 114 to index between various configurations as is described in greater detail herein. Once the first fixed end 104 and the second fixed end 106 are coupled to the indexable center bar 102 as shown in FIG. 10, the fixed end attachment mechanisms 142 may be placed inside the sidewall accessory tracks 18 and the indexable center bar 102 may be slid forward and rearward in the vehicle longitudinal direction to the appropriate position.

Figure 11:
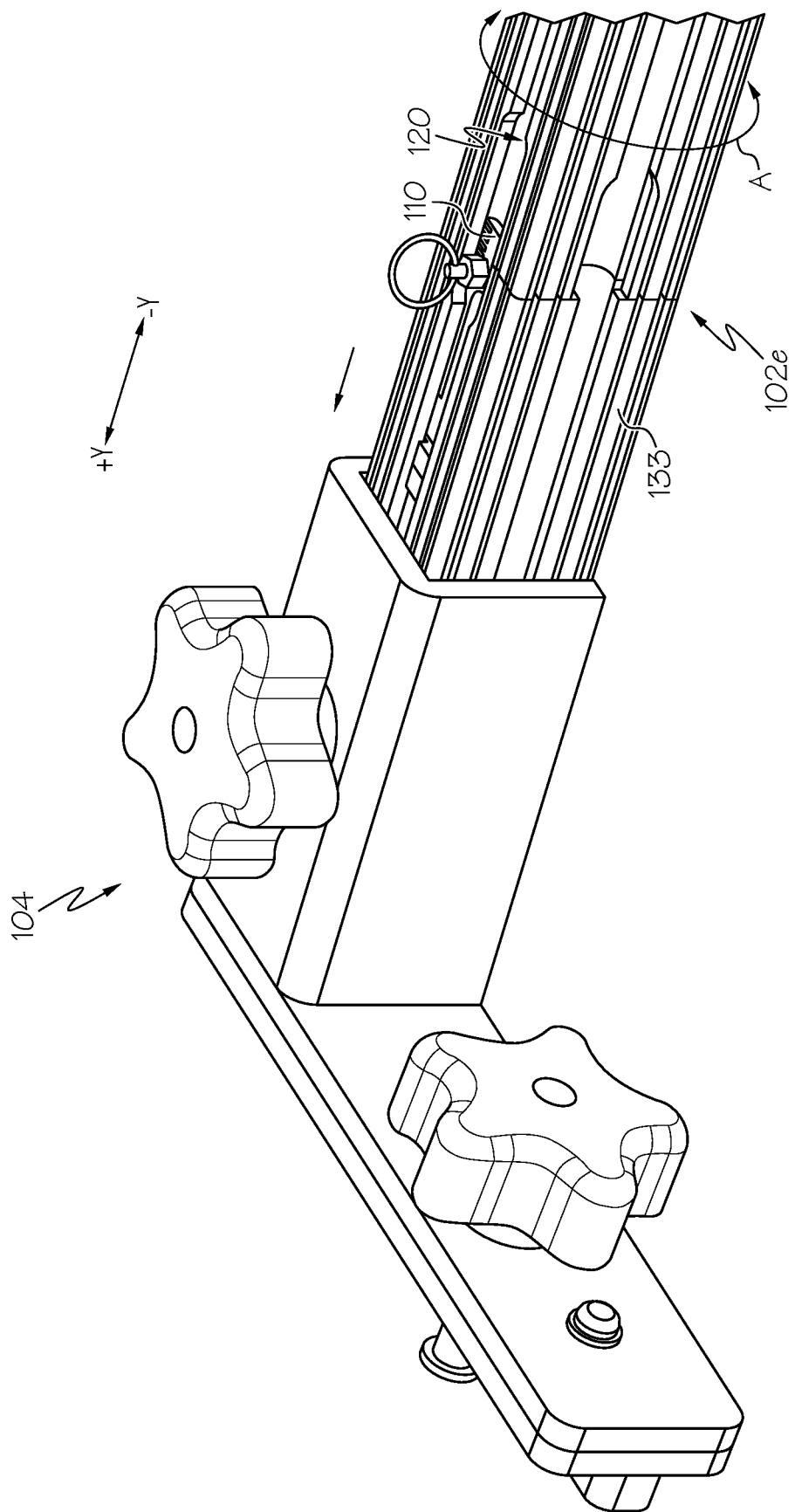
FIG. 11 depicts a zoomed-in view of a first side end of the truck bed storage system of FIG. 1 with a pull pin in an unlocked position, according to one or more embodiments shown and described herein.

Referring to FIGS. 10 and 11, the mechanism for locking the indexable center bar 102 in a particular configuration (e.g., with the appropriate accessories extending from the indexable center bar 102 in a selected direction) is depicted. FIG. 10 shows the first fixed end 104 including the biased pin 110 extending inward from the first fixed bar 133 into a locked position. In the locked position, the biased pin 110 extends inward from the first fixed bar 133 into one of the accessory channels 120 of the indexable center bar 102. In the locked position the biased pin 110 inhibits rotation of the indexable center bar 102. The biased pin 110 may be biased in the vehicle inward direction, so the indexable center bar 102 may default to a locked position.

As shown in FIG. 11, the biased pin 110 can move in the vehicle outward direction so that it is clear of the outward end of the indexable center bar 102. Once the biased pin 110 is clear of the accessory channel 120, the indexable center bar 102 can rotate about the fixed end pegs 114 as indicated by double arrow A in FIG. 11. In some embodiments, one or both of the biased pins 110 on the first end 102e and second end of the indexable center bar 102 may include an interlocking mechanism that holds the biased pin 110 in the unlocked position overcoming the bias of the biased pin 110. This may allow, for instance, one of the biased pins 110 to remain in the unlocked position while the other is selectively moved from the locked position to the unlocked position so that a user or users need not pull both biased pins 110 outward simultaneously. In other embodiments, the biased pins 110 may be mechanically coupled such that pulling one biased pin 110 from the locked position to the unlocked position also pulls the other biased pin 110 from the locked position to the unlocked position. In some embodiments, only one of the first fixed end 104 and the second fixed end 106 includes a biased pin 110.

Figure 12:
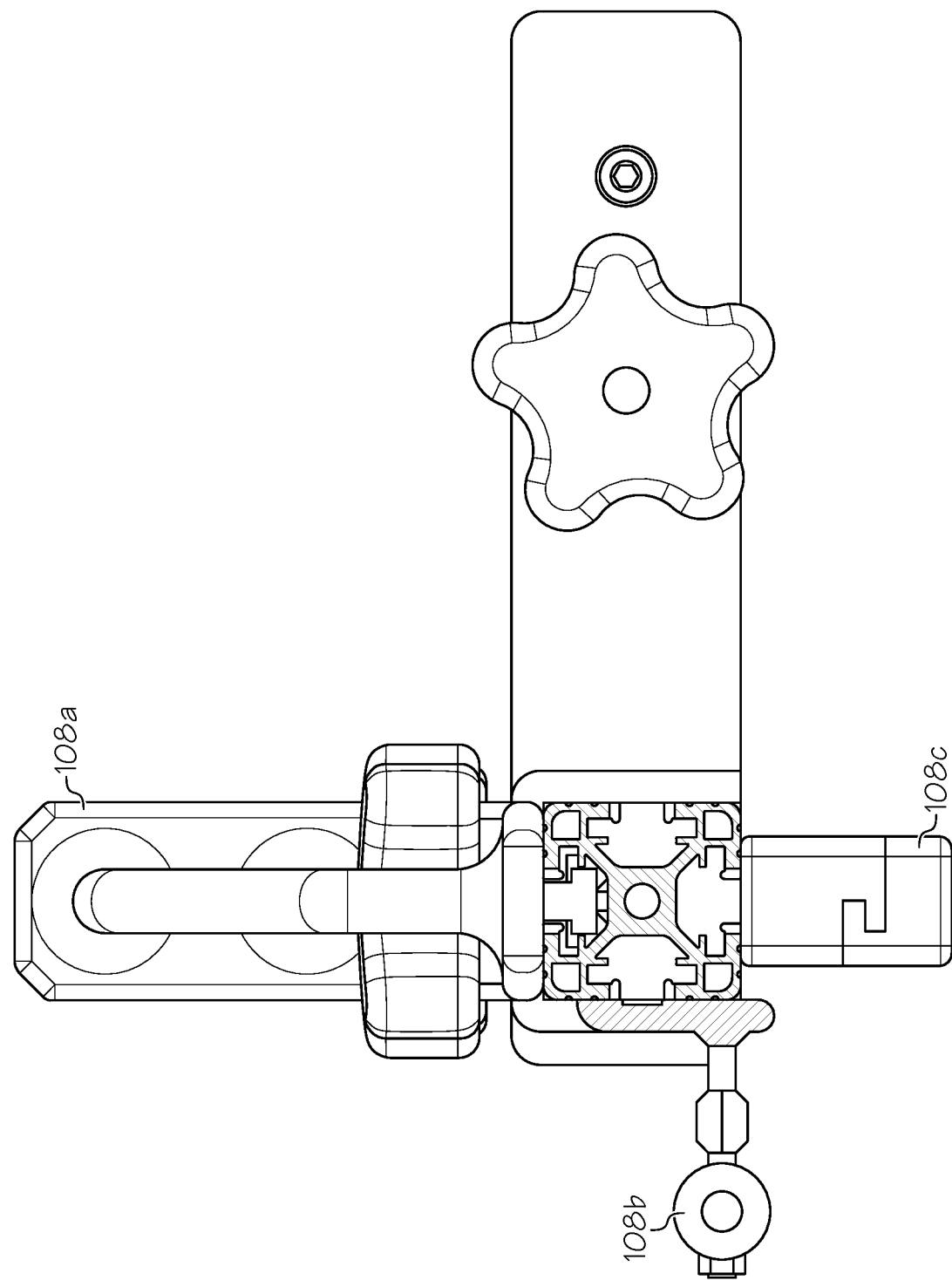
FIG. 12 depicts a cross sectional view of the truck bed storage system of FIG. 7 including three accessories installed on the truck bed storage system, according to one or more embodiments shown and described herein.
Figure 13:
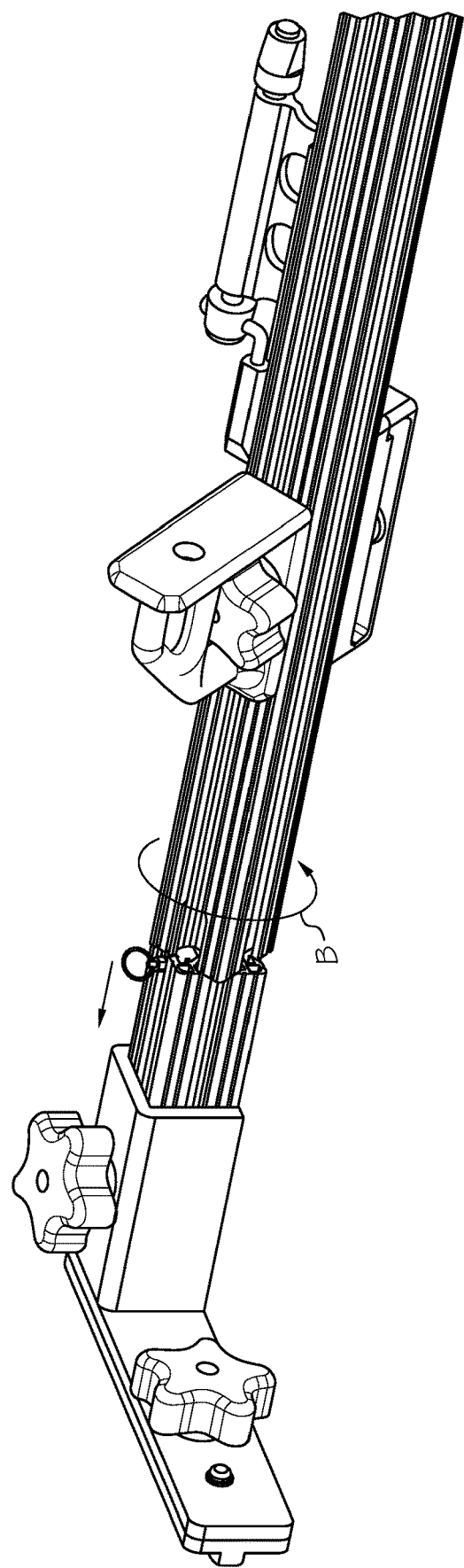
FIG. 13 depicts the truck bed storage system of FIG. 11 rotating between a first locking position and a second locking position, according to one or more embodiments shown and described herein.

Referring to FIGS. 10-14, rotation of the indexable center bar 102 is depicted. As shown in FIG. 10, the indexable center bar 102 is in a first position. The biased pin 110 may be pulled to an unlocked position as described herein with respect to FIG. 11 such that the biased pin 110 is removed from the accessory channel 120 of the indexable center bar 102. As shown in FIG. 12, the indexable center bar 102 is rotatable between a first position and a second position. While the indexable center bar 102 is between the first position and the second position the biased pin 110 may be prevented from returning to the locked position by the radial wall 124 (FIG. 4). It is contemplated that the indexable center bar 102 may rotate in either the counter-clockwise or the clockwise direction to shift between positions.

Rotation of the indexable center bar 102 may continue in substantially the same manner to shift the indexable center bar 102 to the third and fourth positions. Additionally, embodiments are not limited to shifting between the various positions of the indexable center bar 102 sequentially. It is contemplated that the indexable center bar 102 may shift between its various positions out of sequence, for example, the indexable center bar 102 may shift from the first position to the third position and vice-a-versa or from the second position to the fourth position and vice-a-versa.

It should now be understood that an adaptable cargo assembly can include an indexable center bar with one or more slots for receiving accessories. The accessories may be used to store or otherwise retain various objects within a truck bed or other storage location of a vehicle. The adaptability of the cargo assembly increases the number of objects and the number of types of objects that can be stored within the vehicle, generally making the vehicle more useful.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
a cargo area comprising a first sidewall and a second sidewall; and
an adaptable storage system configured to receive accessories comprising:
an anchoring assembly comprising a first fixed end coupled to the first sidewall and a second fixed end coupled to the second sidewall, the anchoring assembly comprising at least one pin moveable between a locked position and an unlocked position; and
an indexable center bar that extends between the first fixed end and the second fixed end, the indexable center bar comprising a plurality of accessory channels on a plurality of sides of the indexable center bar, the accessory channels extending at least a portion of a length of the indexable center bar, wherein
the indexable center bar is indexable relative to the first fixed end and the second fixed end between a plurality of discrete positions corresponding to the plurality of accessory channels and the pin locks the indexable center bar in one of the discrete positions when the pin is moved to the locked position.

2. The vehicle of claim 1, wherein the first fixed end is moveably coupled to the first sidewall and the second fixed end is moveably coupled to the second sidewall.

3. The vehicle of claim 1, wherein the indexable center bar comprises four sides.

4. The vehicle of claim 1, wherein each side of the indexable center bar comprises an accessory channel.

5. The vehicle of claim 4, wherein each accessory channel comprises an outer lip and an inner lip.

6. The vehicle of claim 1, wherein the first fixed end comprises a sidewall clamp for fixing a position of the first fixed end along the first sidewall, the sidewall clamp comprising an adjustment knob having an axis of rotation offset from a rotation axis of the indexable center bar.

7. The vehicle of claim 1, wherein the pin is biased in the vehicle inward direction so as to extend parallel to a rotation axis of the indexable center bar.

8. The vehicle of claim 1, wherein the first fixed end and the second fixed end each comprise a pin extending inward from the first fixed end and the second fixed end and both of the pins extending from the first fixed end and the second fixed end are biased in the vehicle inward direction so as to extend parallel to a rotation axis of the indexable center bar.

9. The vehicle of claim 8, wherein the pins extending from the first fixed end and the second fixed end are biased using a spring.

10. An adaptable storage system configured to receive accessories comprising:
an anchoring assembly comprising a first fixed end configured to be coupled to a first sidewall of a vehicle cargo area and a second fixed end configured to be coupled to a second sidewall of the vehicle cargo area, the anchoring assembly comprising at least one pin moveable between a locked position and an unlocked position;
an indexable center bar that extends between the first fixed end and the second fixed end, the indexable center bar comprising a plurality of accessory channels on a plurality of sides of the indexable center bar, the accessory channels extending at least a portion of a length of the indexable center bar, wherein
the indexable center bar is indexable relative to the first fixed end and the second fixed end between a plurality of discrete positions corresponding to the plurality of accessory channels and the pin locks the indexable center bar in one of the discrete positions when the pin is moved to the locked position.

11. The adaptable storage system of claim 10, wherein the pin is configured to extend into an accessory channel of the indexable center bar when in the locked position and to retract from the accessory channel of the indexable center bar when moved to the unlocked position.

12. The adaptable storage system of claim 10, wherein:
the first fixed end comprises a first anchor and the first anchor comprises a top wall and two sidewalls; and
the second fixed end comprises a second anchor and the second anchor comprises a top wall and two sidewalls.

13. The adaptable storage system of claim 12, wherein the first anchor is configured to receive a first fixed bar and the second anchor is configured to receive a second fixed bar.

14. The adaptable storage system of claim 13, wherein the first fixed bar and the second fixed bar each comprise a fixed end peg extending inward from the first fixed bar and the second fixed bar along a rotation axis of the indexable center bar.

15. The adaptable storage system of claim 14, wherein the indexable center bar comprises a support hole that is configured to slide over the fixed end pegs to hold the indexable center bar up in a vertical direction.

16. The adaptable storage system of claim 11, the first fixed end comprises a sidewall clamp for fixing a position of the first fixed end along the first sidewall, the sidewall clamp comprising an adjustment knob having an axis of rotation offset from a rotation axis of the indexable center bar.

17. The adaptable storage system of claim 11, wherein the indexable center bar comprises a plurality of T-bar slots, each T-bar slot disposed on a side of the indexable center bar and configured to receive a plurality of accessories.

18. The adaptable storage system of claim 17, wherein the T-bar slot comprises an inner lip and an outer lip.

19. A method of installing an adaptable storage system within a cargo area of a vehicle, the cargo area having a first sidewall and a second sidewall, the method comprising:
installing an anchoring system of the adaptable storage system to the first and second sidewalls of the vehicle, the anchoring system comprising a first fixed end configured to be coupled to the first sidewall and a second fixed end configured to be coupled to the second sidewall, the first fixed end and the second fixed end each including a fixed end peg arranged to extend in a vehicle inward direction from the first fixed end and the second fixed end;
inserting the fixed end pegs through a support hole of an indexable center bar of the adaptable storage system to hold the indexable center bar in a vehicle vertical direction, wherein the indexable center bar is selectively rotatable about the fixed end pegs of the first fixed end and the second fixed end; and
installing an accessory in an accessory channel of the indexable center bar wherein one or more of the first fixed end and the second fixed end includes a pin that is moveable from a locked position to an unlocked position, wherein the pin slides into the accessory channel of the indexable center bar to rotatively lock the indexable center bar in one or more discrete angular positions along a rotation axis of the indexable center bar.

20. The method of claim 19, wherein the pin is biased to slide into the accessory channel.

* * * * *